(12) United States Patent
Okada (10) Patent No.: US 9,056,397 B2
(45) Date of Patent: Jun. 16, 2015

(54) ROBOT

(75) Inventor: Takuya Okada, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 361 days.

(21) Appl. No.: 13/597,208

(22) Filed: Aug. 28, 2012

(65) Prior Publication Data

US 2013/0055842 A1 Mar. 7, 2013

(30) Foreign Application Priority Data

Sep. 1, 2011 (JP) ................................. 2011-191088

(51) Int. Cl.
*B25J 18/00* (2006.01)
*B25J 17/02* (2006.01)
*B25J 9/10* (2006.01)

(52) U.S. Cl.
CPC ........ *B25J 17/0283* (2013.01); *Y10T 74/20317* (2013.01); *B25J 9/102* (2013.01)

(58) Field of Classification Search
CPC ............. F16H 1/145; B25J 18/00; B23K 9/00
USPC .................. 74/490.03, 490.06; 901/23, 29, 42
See application file for complete search history.

(56) References Cited

U.S. PATENT DOCUMENTS

| 4,972,735 A | 11/1990 | Torii et al. |
| 2004/0261562 A1 | 12/2004 | Haniya et al. |
| 2009/0314120 A1 * | 12/2009 | Larsson ...................... 74/490.02 |
| 2010/0095800 A1 * | 4/2010 | Palau et al. ................. 74/490.03 |
| 2011/0041637 A1 * | 2/2011 | Schmidt et al. ............. 74/421 A |
| 2011/0120245 A1 * | 5/2011 | Long .............................. 74/409 |
| 2011/0290060 A1 * | 12/2011 | Long ............................ 74/490.01 |
| 2011/0296944 A1 * | 12/2011 | Carter et al. ............... 74/490.05 |
| 2012/0266712 A1 * | 10/2012 | Oka et al. ................... 74/490.05 |
| 2012/0266720 A1 * | 10/2012 | Oka et al. ................... 74/665 H |
| 2013/0055842 A1 * | 3/2013 | Okada ......................... 74/490.03 |
| 2014/0224058 A1 * | 8/2014 | Tanaka et al. .............. 74/490.05 |

FOREIGN PATENT DOCUMENTS

| CN | 1575220 | 2/2005 |
| EP | 0269751 | 6/1988 |
| EP | 1886773 | 2/2008 |
| EP | 1938930 | 7/2008 |
| JP | 62-287991 | 12/1987 |
| JP | 01-157775 | 6/1989 |
| JP | 05-115962 | 5/1993 |
| JP | 05-318374 | 12/1993 |
| JP | 2008-044019 | 2/2008 |
| JP | 2009-028875 | 2/2009 |
| JP | 2010-094749 | 4/2010 |
| JP | 2010-269400 | 12/2010 |
| WO | 96/22861 | 8/1996 |

OTHER PUBLICATIONS

Extended European Search Report for corresponding EP Application No. 12181367.9-2316, Dec. 5, 2012.

(Continued)

*Primary Examiner* — David M Fenstermacher
(74) *Attorney, Agent, or Firm* — Mori & Ward, LLP (57) ABSTRACT

A robot according to an aspect of embodiments includes a motor and a hypoid gear. The motor is provided in a robot arm. The hypoid gear transmits the driving force of the motor to a leading-edge arm coupled to the robot arm to swing the leading-edge arm or to rotate an end effector.

8 Claims, 6 Drawing Sheets

(56) References Cited

OTHER PUBLICATIONS

Japanese Office Action for corresponding JP Application No. 2011-191088, Aug. 6, 2013.

Korean Office Action for corresponding KR Application No. 10-2012-0095819, Sep. 17, 2014.

Chinese Office Action for corresponding CN Application No. 201210320203.X, Nov. 6, 2014.

* cited by examiner

ROBOT

CROSS-REFERENCE TO RELATED APPLICATION

This application is based upon and claims the benefit of priority of the prior Japanese Patent Application No. 2011-191088, filed on Sep. 1, 2011, the entire contents of which are incorporated herein by reference.

FIELD

The embodiments discussed herein are directed to a robot.

BACKGROUND

There is known a conventional robot in which an end effector is attached to a leading-edge arm such as a wrist unit coupled to a robot arm and that swings the leading-edge arm and rotates the end effector by using a motor provided inside the robot arm to automatically perform a predetermined operation.

In this robot, a drive pulley attached to the motor and a driven pulley attached to the swing axis of the leading-edge arm and the rotation axis of the end effector are coupled by an endless belt in an interlocking manner. The robot has been known as disclosed in, for example, Japanese Laid-open Patent Publication No. 2010-094749. As a result, a driving force of the motor is transmitted to the swing axis of the leading-edge arm or the rotation axis of the end effector.

SUMMARY

A robot according to an aspect of embodiments includes a motor and a hypoid gear. The motor is provided in a robot arm. The hypoid gear transmits a driving force of the motor to a leading-edge arm coupled to the robot arm to swing the leading-edge arm or to rotate an end effector.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Hereinafter, a robot according to embodiments of the present disclosure will be explained in detail by using an arc welding robot as an example with reference to the accompanying drawings. In addition, the embodiments disclosed below are not intended to limit the present invention.

First Embodiment

Figure 1:
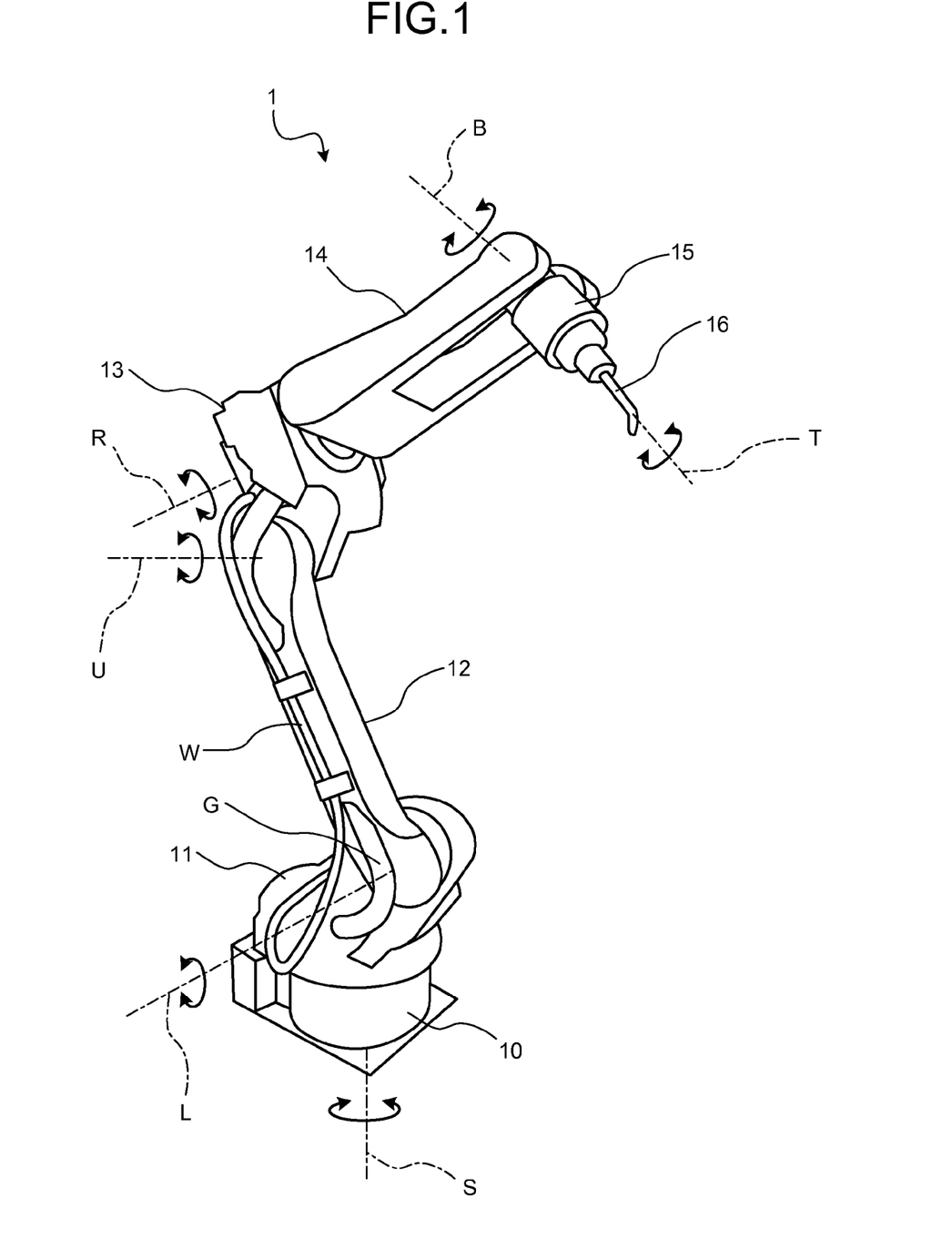
FIG. 1 is an oblique schematic diagram of a robot according to a first embodiment.

FIG. 1 is an oblique schematic diagram of a robot 1 according to the first embodiment. As illustrated in FIG. 1, the robot 1 includes an underlying part 10 that is attached on a base fixed to a floor or the like, a multi-axis robot arm that extends from the underlying part 10, and an end effector that is attached to the leading end of the robot arm. Herein, the end effector is a torch 16 for arc welding.

The robot arm are constituted by five arms that are a first arm 11, a second arm 12, a third arm 13, a fourth arm 14, and a fifth arm 15, which are sequentially coupled, from the bottom side (the underlying part 10) toward the leading side (the torch 16).

An actuator is provided inside each of the arms. As illustrated by both-direction arrows of FIG. 1, each of the arms is rotatably driven or swingably driven by the corresponding actuator by using a coupling part between the arms as a joint.

More specifically, when the installation surface of the robot 1 is a horizontal plane, the first arm 11 is rotatably driven by using an axis S parallel to the normal line (a virtual line extending in a vertical direction) of the horizontal plane as a rotation axis. The second arm 12 is swingably driven by using an axis L, whose extension direction is different from that of the axis S by 90 degrees, as a swing axis.

The third arm 13 is swingably driven by using an axis U, whose extension direction is parallel to that of the axis L, as a swing axis. The fourth arm 14 is rotatably driven by using an axis R, whose extension direction is different from that of the axis U by 90 degrees, as a rotation axis.

The fifth arm 15 is swingably driven by using an axis B, whose extension direction is different from that of the axis R by 90 degrees, as a swing axis. The arc welding torch 16 that is an end effector is coupled to the leading end of the fifth arm 15.

The torch 16 is rotatably driven by using an axis T, whose extension direction is different from that of the axis B by 90 degrees, as a rotation axis. As described above, the robot 1 is a one-arm multi-axis robot that has five axes as a degree of freedom. However, a degree of freedom of joints of the robot 1 according to the embodiment is not limited to five axes.

In the robot 1, a welding wire that acts as filler metal for arc welding is supplied from the outside of the robot 1 to the torch 16 by way of a wire hose W. Furthermore, in the robot 1, shielding gas such as argon and carbonic acid gas is supplied from the outside of the robot 1 to the torch 16 by way of a gas hose G.

Herein, the wire hose W is introduced into the third arm 13 by way of the lateral surface of the second arm 12. On the other hand, the gas hose G is introduced into the third arm 13 by way of the inside of the second arm 12. The leading end of the gas hose G is coupled to the wire hose W inside the third arm 13.

Thus, the welding wire and the shielding gas are supplied to the torch 16 through the wire hose W. An action of the wire hose W to which the gas hose G is coupled is explained below with reference to FIG. 2A.

The robot 1 actuates the first to fifth arms 11 to 15 and the torch 16, makes the torch 16 come close to a welding target, and generates an electric arc while ejecting the shielding gas from the torch 16 in order to perform arc welding, in accordance with the control of a robot controller (not illustrated).

Next, the configuration of the fourth arm 14 and the fifth arm 15 is explained with reference to FIGS. 2A and 2B. Herein, the fifth arm 15 is an arm that is coupled to the most leading side of the robot arm. For this reason, for the sake of convenience, the fifth arm 15 is referred to as the leading-edge arm 15 and the fourth arm 14 is referred to as the robot arm 14 to distinguish it from the leading-edge arm 15.

Figure 2A:
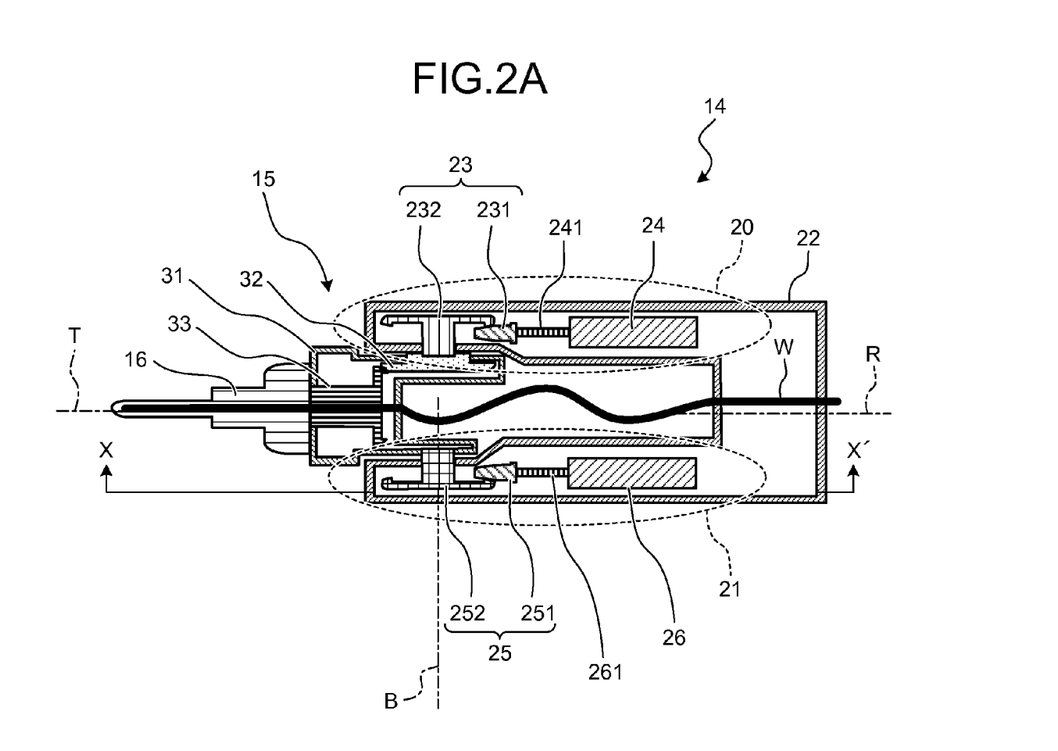
FIGS. 2A and 2B are schematic explanation diagrams illustrating the inside of a leading-edge arm and a robot arm according to the first embodiment.
Figure 2B:
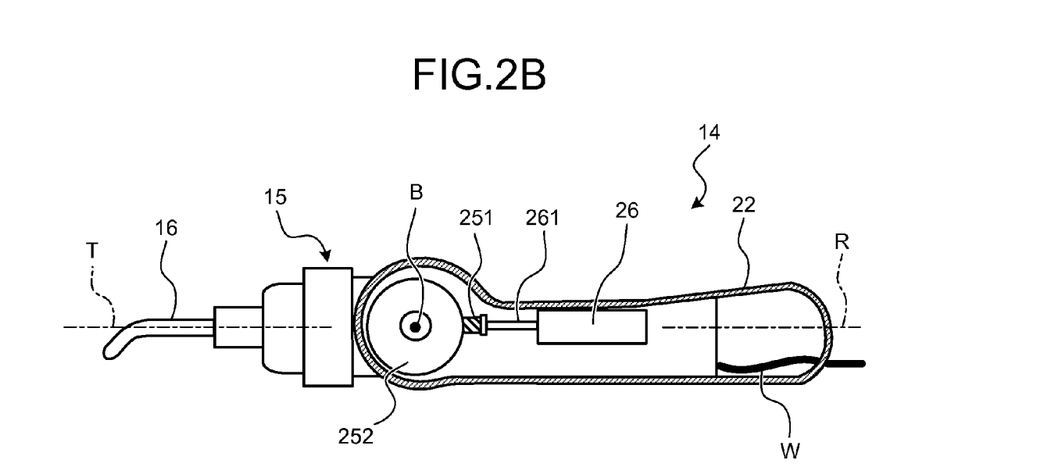

FIGS. 2A and 2B are schematic explanation diagrams illustrating the inside of the leading-edge arm 15 and the robot arm 14 according to the first embodiment. More specifically, FIG. 2A illustrates a schematic cross section that is obtained by cutting the leading-edge arm 15, the robot arm 14, and the torch 16 with a plane that includes the axis R, the axis B, and the axis T after swinging the leading-edge arm 15 in such a manner that the axis R, the axis B, and the axis T are on the same plane. Moreover, FIG. 2B illustrates a schematic cross section viewed from an X-X' line of FIG. 2A.

As illustrated in FIGS. 2A and 2B, the robot arm 14 includes a housing 22 that has a pair of a first housing part 20 and a second housing part 21 that extend from the bottom end toward the leading end of the robot arm 14.

The first housing part 20 places therein a motor 24 for rotation that drives a hypoid gear 23 and a hypoid gear 23 for rotating the torch 16. Herein, the motor 24 for rotation is positioned so that the rotation axis of a rotating shaft 241 becomes the extension direction (direction parallel to the axis R) of the first housing part 20.

The hypoid gear 23 includes a pinion gear 231 that is fitted into the rotating shaft 241 of the motor 24 for rotation and a bevel gear 232 that is engaged with the pinion gear 231. Herein, the bevel gear 232 of the hypoid gear 23 is positioned in a direction (direction parallel to the axis B) in which an angle formed by its rotation axis and the rotation axis of the pinion gear 231 is 90 degrees.

In the hypoid gear 23, the bevel gear 232 is rotated at a rotational speed slower than that of the pinion gear 231. In other words, the hypoid gear 23 functions as a speed reduction mechanism that decelerates the output of the motor 24 for rotation.

On the other hand, the second housing part 21 places therein a motor 26 for swing that drives a hypoid gear 25 and a hypoid gear 25 for swinging the leading-edge arm 15. Herein, the motor 26 for swing is positioned so that the rotation axis of a rotating shaft 261 becomes the extension direction (direction parallel to the axis R) of the second housing part 21.

The hypoid gear 25 includes a pinion gear 251 that is fitted into the rotating shaft 261 of the motor 26 for swing and a bevel gear 252 that is engaged with the pinion gear 251. Herein, the bevel gear 252 of the hypoid gear 25 is positioned in a direction (direction identical with the axis B) in which an angle formed by its rotation axis and the rotation axis of the pinion gear 251 is 90 degrees.

In the hypoid gear 25, the bevel gear 252 is rotated at a rotational speed slower than that of the pinion gear 251. In other words, the hypoid gear 25 functions as a speed reduction mechanism that decelerates the output of the motor 26 for swing.

The leading-edge arm 15 includes a tubular housing 31. The tubular housing 31 places therein a bevel gear 32 and a bevel gear 33. The bevel gear 32 rotates along with the bevel gear 232 of the hypoid gear 23 that is driven by the motor 24 for rotation. The bevel gear 33 is engaged with the bevel gear 32.

Herein, the bevel gear 32 driven by the hypoid gear 23 is positioned so that its rotation axis is parallel to the axis B. Moreover, the bevel gear 33 driven by the bevel gear 32 is positioned so that its rotation axis is a direction parallel to the axis T. The torch 16 is coupled to the leading end of the rotating shaft of the bevel gear 33.

In the tubular housing 31 of the leading-edge arm 15, an outer surface facing the inner surface of the second housing part 21 is fixed to the rotating shaft of the bevel gear 252 of the hypoid gear 25 driven by the motor 26 for swing. As described above, the leading-edge arm 15 is provided between the first housing part 20 and the second housing part 21 of the robot arm 14.

By employing this configuration, the robot 1 sequentially transmits the driving force of the motor 24 for rotation to the rotating shaft 241, the hypoid gear 23 (the pinion gear 231 and the bevel gear 232), the bevel gear 32, the bevel gear 33, and the torch 16 in order of them. As a result, the robot 1 rotates the torch 16 by using the axis T as a rotation axis.

Moreover, the robot 1 sequentially transmits the driving force of the motor 26 for swing to the rotating shaft 261, the hypoid gear 25 (the pinion gear 251 and the bevel gear 252), and the tubular housing 31 of the leading-edge arm 15 in order of them. As a result, the robot 1 swings the leading-edge arm 15 by using the axis B as a swing axis.

As described above, the robot 1 transmits the driving force of the motor 24 for rotation to the torch 16 through the hypoid gear 23, the bevel gear 32, and the bevel gear 33 and transmits the driving force of the motor 26 for swing to the leading-edge arm 15 through the hypoid gear 25.

As a result, the robot 1 can transmit the driving forces of the motor 24 for rotation and the motor 26 for swing to the torch 16 and the leading-edge arm 15 without using an endless belt. Therefore, according to the robot 1, the number of parts required for rotating the torch 16 and for swinging the leading-edge arm 15 can be reduced and thus a production cost of the robot 1 can be reduced.

Moreover, according to the robot 1, because the rigidity of a mechanism that performs the rotation of the torch 16 and the swing of the leading-edge arm 15 is high compared to the case where an endless belt is used, durability against vibration can be improved.

Moreover, a gear such as the hypoid gear 23 and the hypoid gear 25 is a longer lasting component compared to an endless belt. For this reason, the robot 1 can reduce a maintenance cost compared to another robot that uses an endless belt.

As described above, according to the robot 1, because the leading-edge arm 15 is disposed between the first housing part 20 and the second housing part 21 of the robot arm 14, the leading-edge arm 15 can be stably supported by both sides.

In the robot arm 14, the motor 24 for rotation and the hypoid gear 23 are disposed in the first housing part 20 and the motor 26 for swing and the hypoid gear 25 are disposed in the second housing part 21.

Therefore, according to the robot arm 14, a weight balance of both sides (hereinafter, "left and right") of the axis R can be equally achieved. As a result, it is possible to improve easiness and accuracy of rotation control that is performed by the robot controller on the robot arm 14 by using the axis R as a rotation axis.

The first housing part 20 and the second housing part 21 are formed to be a symmetric figure as illustrated in FIG. 2A. As a result, the robot arm 14 can employ a common motor in place of the motor 24 for rotation and the motor 26 for swing and can employ a common gear in place of the hypoid gear 23 and the hypoid gear 25.

When this configuration is employed, a weight balance of left and right sides of the robot arm 14 can be equally achieved. As a result, easiness and accuracy of rotation control that is performed by the robot controller on the robot arm 14 by using the axis R as a rotation axis can be still more improved.

According to the robot arm 14, because the number of the types of components is decreased by employing a common motor for the motor 24 for rotation and the motor 26 for swing and a common gear for the hypoid gear 23 and the hypoid gear 25, a production cost of the robot 1 can be reduced.

In the robot 1, the wire hose W that is the path of the welding wire and the shielding gas is coupled to the torch 16 by way of the space sandwiched by the first housing part 20 and the second housing part 21 and the inside of the leading-edge arm 15, as illustrated in FIG. 2A.

As a result, in the robot 1, the welding wire that acts as filler metal for arc welding is supplied to the torch 16 by way of the space sandwiched by the first housing part 20 and the second housing part 21 and the inside of the leading-edge arm 15.

By employing this configuration, the wire hose W can be prevented from interfering with other members outside the robot arm 14 when the robot 1 is actuated. Therefore, according to the robot 1, the breaking of welding wire and the leakage of shielding gas caused by the damage of the wire hose W can be prevented.

By employing this configuration, according to the robot 1, because the wire hose W can be shortened compared to the case where the wire hose W is coupled to the torch 16 by way of the inside of the first housing part 20 or the second housing part 21, a production cost can be reduced.

The hypoid gear 23 and the hypoid gear 25 function as speed reduction mechanisms that reduce the rotational speeds of the motor 24 for rotation and the motor 26 for swing. As a result, because the robot 1 does not require a more expensive ready-made speed reducer than the hypoid gear 23 and the hypoid gear 25, a production cost can be reduced.

Moreover, the hypoid gear 23 and the hypoid gear 25 can comparatively easily change the layout of the speed reduction mechanism only by changing the size and combination of the pinion gear 231 and the pinion gear 251 and the size and combination of the bevel gear 232 and the bevel gear 252.

In other words, the robot 1 has a higher degree of freedom with respect to the change of the internal layout of the robot arm 14 compared to when the ready-made speed reducer is provided. Therefore, the robot 1 can easily optimize the internal layout of the robot arm 14 by changing the size and configuration of the hypoid gear 23 and the hypoid gear 25.

As described above, the robot 1 according to the first embodiment transmits the driving force of the motor 24 for rotation provided inside the robot arm 14 to the torch 16 via the hypoid gear 23 to rotate the torch 16.

Moreover, the robot 1 transmits the driving force of the motor 26 for swing provided inside the robot arm 14 to the leading-edge arm 15 via the hypoid gear 25 to swing the leading-edge arm 15. In other words, the robot 1 does not require providing an endless belt to swing the leading-edge arm 15 and to rotate the torch 16.

Therefore, according to the robot 1 according to the first embodiment, a production cost can be reduced because the number of parts required for swinging the leading-edge arm 15 and rotating the torch 16 is reduced.

Second Embodiment

Next, a robot 1a according to the second embodiment will be explained with reference to FIG. 3. In the robot 1a according to the second embodiment, the configuration of parts that are located at a more front side than the third arm 13 is different from that of the robot 1 according to the first embodiment. In other words, the configuration of the underlying part 10, the first arm 11, the second arm 12, and the third arm 13 of the robot 1a according to the second embodiment is similar to that of the robot 1 according to the first embodiment.

For this reason, the configuration of parts that are located at a more front side than the third arm 13 of the robot 1a will be below explained. FIG. 3 is a sectional schematic diagram illustrating the configuration of parts that are located at a more front side than the third arm 13 of the robot 1a according to the second embodiment.

Figure 3:
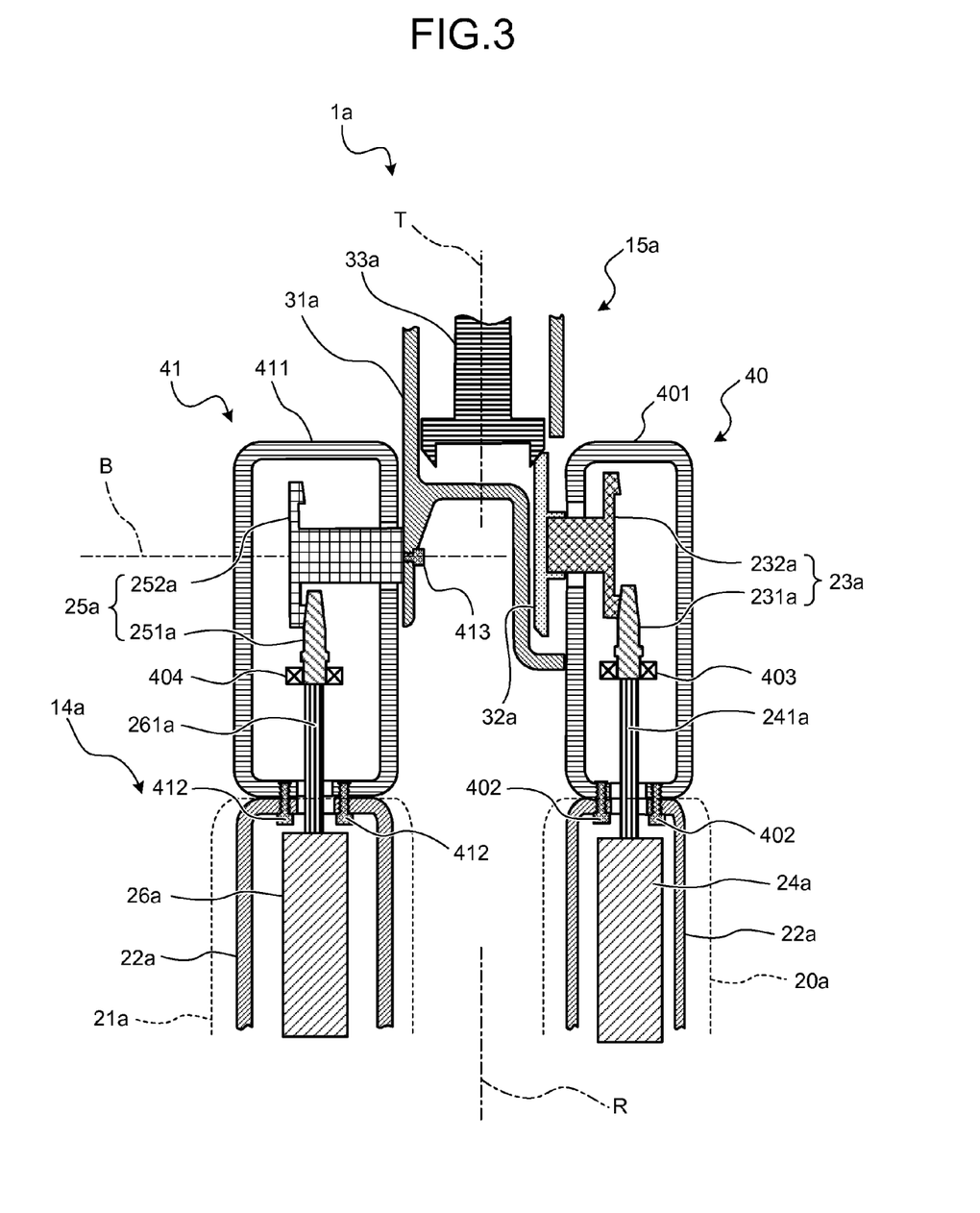
FIG. 3 is a sectional schematic diagram illustrating the configuration of parts that are located at a more front side than a third arm of a robot according to a second embodiment.

Herein, a schematic cross section obtained by cutting the robot 1a with a plane that includes the axis R, the axis B, and the axis T after swinging a leading-edge arm 15a so that the axis R, the axis B, and the axis T are located on the same plane is illustrated in FIG. 3.

From the viewpoint of simplification of explanation, the wire hose W is not illustrated in FIG. 3. However, the wire hose W of the robot 1a is coupled to the torch 16 through the same route as that of the robot 1 according to the first embodiment.

As illustrated in FIG. 3, the robot 1a includes detachable gear units 40 and 41 through which a robot arm 14a is coupled to the leading-edge arm 15a. Herein, the gear unit 40 includes a hypoid gear 23a that rotates the torch 16. Moreover, the gear unit 41 includes a hypoid gear 25a that swings the leading-edge arm 15a.

More specifically, the robot arm 14a of the robot 1a includes a housing 22a that has a pair of a first housing part 20a and a second housing part 21a that extend from the bottom end toward the leading end of the robot arm 14a.

The first housing part 20a places therein a motor 24a for rotation that rotates the torch 16. Herein, the motor 24a for rotation is positioned so that the rotation axis of a rotating shaft 241a becomes the extension direction (direction parallel to the axis R) of the first housing part 20a. The motor 24a for rotation is placed in the first housing part 20a in the state where the rotating shaft 241a is rotatably projected from the leading end of the first housing part 20a.

The hypoid gear 23a driven by the motor 24a for rotation is placed in a gear box 401 that is attachable to and detachable from the leading end of the first housing part 20a of the robot arm 14a. The hypoid gear 23a includes a pinion gear 231a that is supported by a bearing 403 and a bevel gear 232a that is engaged with the pinion gear 231a.

The pinion gear 231a and the bevel gear 232a are positioned so that an angle formed by each rotation axis is 90 degrees. Moreover, the gear box 401 that places therein the hypoid gear 23a includes a hole into which the rotating shaft 241a of the motor 24a for rotation fitted to the pinion gear 231a is inserted and a hole through which the rotating shaft of the bevel gear 232a is projected to the outside.

Herein, the leading-edge arm 15a includes a tubular housing 31a that places therein a bevel gear 32a and a bevel gear 33a engaged with the bevel gear 32a. The bevel gear 32a placed in the tubular housing 31a is driven by the hypoid gear 23a driven by the motor 24a for rotation to drive the bevel gear 33a. The bevel gear 32a and the bevel gear 33a are positioned so that an angle formed by each rotation axis is 90 degrees. Moreover, the torch 16 is coupled to the leading end of the rotating shaft of the bevel gear 33a.

When the gear unit 40 that places therein the hypoid gear 23a is attached to the robot 1a, the rotating shaft 241a of the motor 24a for rotation is inserted into the predetermined hole of the gear box 401 and is fitted to the pinion gear 231a. Then, the gear box 401 is fastened by bolts 402 to the leading end of the first housing part 20a to couple the gear unit 40 to the robot arm 14a.

Next, the leading-edge arm 15a is swingably coupled to the gear unit 40 by fitting the rotating shaft of the bevel gear 232a of the hypoid gear 23a to the rotating shaft of the bevel gear 32a of the leading-edge arm 15a.

Because the gear unit 40 is attached to the robot 1a as described above, the driving force of the motor 24a for rotation is transmitted to the leading-edge arm 15a via the gear unit 40 and thus the torch 16 can be rotated by using the axis T as a rotation axis.

On the other hand, the second housing part 21a places therein a motor 26a for swing that swings the leading-edge arm 15a. Herein, the motor 26a for swing is positioned so that the rotation axis of a rotating shaft 261a becomes the extension direction (direction parallel to the axis R) of the second housing part 21a. The motor 26a for swing is placed in the second housing part 21a in the state where the rotating shaft 261a is rotatably projected from the leading end of the second housing part 21a.

The hypoid gear 25a driven by the motor 26a for swing to swing the leading-edge arm 15a is placed in a gear box 411 that is attachable to and detachable from the leading end of the second housing part 21a of the robot arm 14a.

The hypoid gear 25a includes a pinion gear 251a that is supported by a bearing 404 and a bevel gear 252a that is engaged with the pinion gear 251a. The pinion gear 251a and the bevel gear 252a are positioned so that an angle formed by each rotation axis is 90 degrees.

Moreover, the gear box 411 includes a hole into which the rotating shaft 261a of the motor 26a for swing fitted to the pinion gear 251a is inserted and a hole through which the rotating shaft of the bevel gear 252a is projected to the outside.

When the gear unit 41 is attached to the robot 1a, the rotating shaft 261a of the motor 26a for swing is inserted into the predetermined hole of the gear box 411 and is fitted to the pinion gear 251a. Then, the gear box 411 is fastened by bolts 412 to the leading end of the second housing part 21a to couple the gear unit 41 to the robot arm 14a.

Next, the leading-edge arm 15a is swingably coupled to the gear unit 41 by fixing the rotating shaft of the bevel gear 252a of the hypoid gear 25a on the lateral surface of the tubular housing 31a of the leading-edge arm 15a by using a bolt 413.

Because the gear unit 41 is attached to the robot 1a as described above, the driving force of the motor 26a for swing is transmitted to the leading-edge arm 15a via the gear unit 41 and thus the leading-edge arm 15a can be swung by using the axis B as a swing axis.

As described above, in the robot 1a according to the second embodiment, the hypoid gear 23a that converts the driving force of the motor 24a for rotation into the turning force of the torch 16 is placed in the gear unit 40 that is attachable to and detachable from the robot 1a.

Furthermore, in the robot 1a, the hypoid gear 25a that converts the driving force of the motor 26a for swing into the swing force of the leading-edge arm 15a is placed in the gear unit 41 that is attachable to and detachable from the robot 1a. As a result, because the assembly operation of the robot 1a can be simplified and thus the working time of a worker required for assembling one robot can be shortened, the production cost of the robot 1a can be reduced.

Third Embodiment

Figure 4:
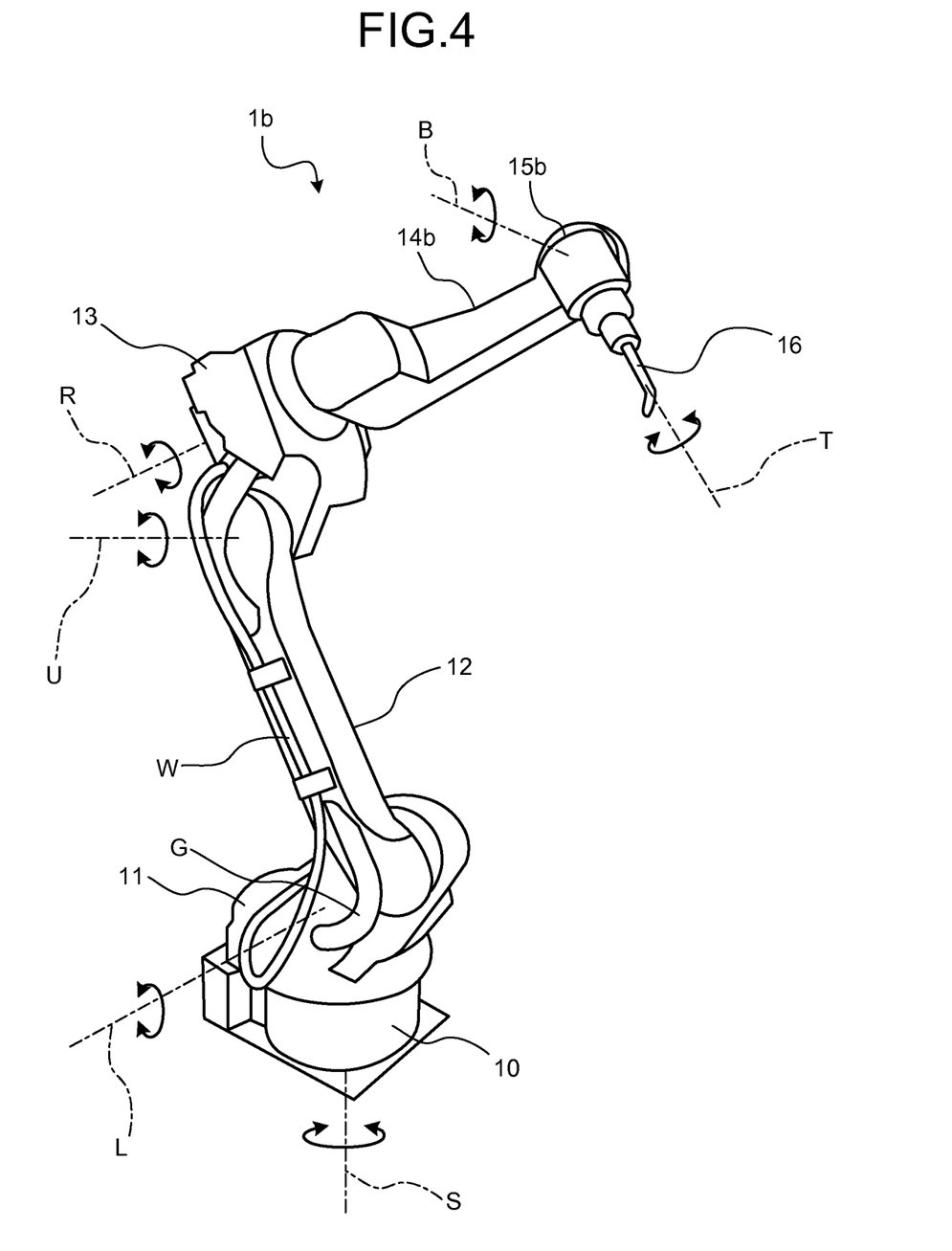
FIG. 4 is an oblique schematic diagram of a robot according to a third embodiment.

Next, a robot 1b according to the third embodiment will be explained. FIG. 4 is an oblique schematic diagram of the robot 1b according to the third embodiment. Herein, the same components of FIG. 4 as those of FIG. 1 have the same reference numbers.

As illustrated in FIG. 4, the robot 1b includes the underlying part 10 that is attached on a base fixed to a floor or the like, a multi-axis robot arm that extends from the underlying part 10, and an end effector that is attached to the leading end of the robot arm. Herein, the end effector is the arc welding torch 16.

The robot arm is constituted by five arms that are the first arm 11, the second arm 12, the third arm 13, a fourth arm 14b, and a fifth arm 15b, which are sequentially coupled, from the bottom side (the underlying part 10) toward the leading side (the torch 16).

An actuator is provided inside each of the arms. As illustrated by both-direction arrows of FIG. 4, each of the arms is rotatably driven or swingably driven by the corresponding actuator by using a coupling part between the arms as a joint.

More specifically, when the installation surface of the robot 1b is a horizontal plane, the first arm 11 is rotatably driven by using the axis S parallel to the normal line (a virtual line extending in a vertical direction) of the horizontal plane as a rotation axis. The second arm 12 is swingably driven by using the axis L, whose extension direction is different from that of the axis S by 90 degrees, as a swing axis.

The third arm 13 is swingably driven by using the axis U, whose extension direction is parallel to that of the axis L, as a swing axis. The fourth arm 14b is rotatably driven by using the axis R, whose extension direction is different from that of the axis U by 90 degrees, as a rotation axis.

The fifth arm 15b is swingably driven by using the axis B, whose extension direction is different from that of the axis R by 90 degrees, as a swing axis. The arc welding torch 16 that is the end effector is coupled to the leading end of the fifth arm 15b.

The torch 16 is rotatably driven by using the axis T, whose extension direction is different from that of the axis B by 90 degrees, as a rotation axis. As described above, the robot 1b is a one-arm multi-axis robot that has five axes as a degree of freedom. However, a degree of freedom of joints of the robot 1b according to the embodiment is not limited to five axes.

In the robot 1b, a welding wire that acts as filler metal for arc welding is supplied from the outside of the robot 1b to the torch 16 by way of the wire hose W. Furthermore, in the robot 1b, shielding gas such as argon and carbonic acid gas is supplied from the outside of the robot 1b to the torch 16 by way of the gas hose G.

Herein, the wire hose W is introduced into the third arm 13 by way of the lateral surface of the second arm 12. On the other hand, the gas hose G is introduced into the third arm 13 by way of the inside of the second arm 12. The leading end of the gas hose G is coupled to the wire hose W inside the third arm 13.

Thus, the welding wire and the shielding gas are supplied to the torch 16 through the wire hose W. The action of the wire hose W to which the gas hose G is coupled is explained below with reference to FIG. 5A.

The robot 1b actuates the first to fifth arms 11 to 15b and the torch 16, makes the torch 16 come close to a welding target, and generates an electric arc while ejecting the shielding gas from the torch 16 in order to perform arc welding, in accordance with the control of a robot controller (not illustrated).

Next, the configuration of the fourth arm 14b and the fifth arm 15b is explained with reference to FIGS. 5A, 5B, and 5C. Herein, the fifth arm 15b is an arm that is coupled to the most leading side of the robot arm. For this reason, for the sake of convenience, the fifth arm 15b is referred to as the leading-edge arm 15b and the fourth arm 14b is referred to as the robot arm 14b to distinguish it from the leading-edge arm 15b.

Figure 5A:
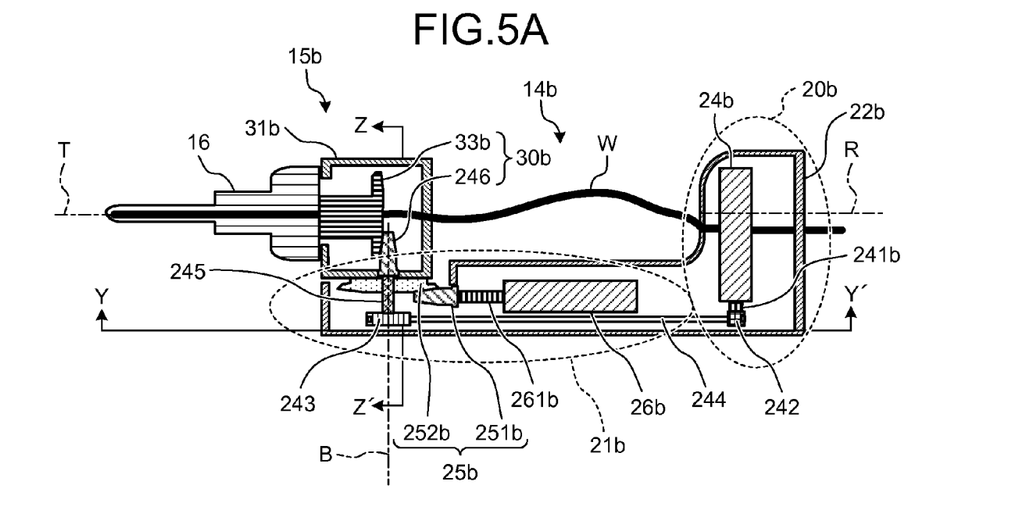
FIGS. 5A to 5C are schematic explanation diagrams illustrating the inside of a leading-edge arm and a robot arm according to the third embodiment.
Figure 5B:
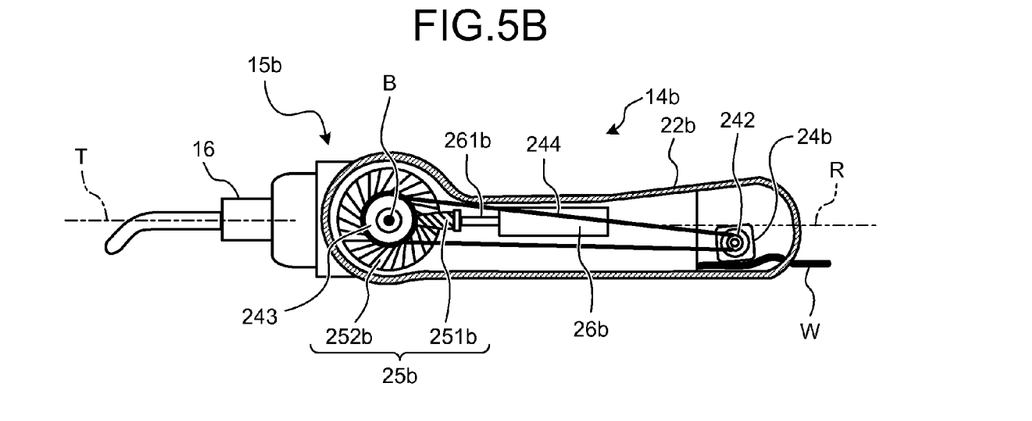
Figure 5C:
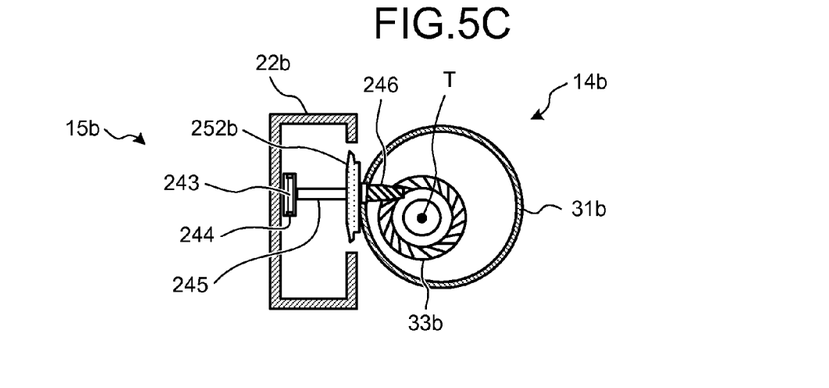

FIGS. 5A, 5B, and 5C are schematic explanation diagrams illustrating the inside of the leading-edge arm 15b and the robot arm 14b according to the third embodiment. More specifically, FIG. 5A illustrates a schematic cross section that is obtained by cutting the leading-edge arm 15b, the robot arm 14b, and the torch 16 with a plane that includes the axis R, the axis B, and the axis T after swinging the leading-edge arm 15b in such a manner that the axis R, the axis B, and the axis T are on the same plane.

Moreover, FIG. 5B illustrates a schematic cross section viewed from a Y-Y' line of FIG. 5A. FIG. 5C illustrates a schematic cross section viewed from a Z-Z' line of FIG. 5A.

As illustrated in FIGS. 5A, 5B, and 5C, the robot arm 14b includes a bottom-side housing part 20b that is provided on the bottom end of the robot arm 14b. Furthermore, the robot arm 14b includes a leading-side housing part 21b that has a narrower width than that of the bottom-side housing part 20b in the robot arm 14b and extends from the bottom-side housing part 20b toward the leading end of the robot arm 14b. The bottom-side housing part 20b and the leading-side housing part 21b are integrally formed and constitute a housing 22b that has a cavity therein.

The bottom-side housing part 20b places therein a motor 24b for rotation that drives a hypoid gear 30b (a pinion gear 246 and a bevel gear 33b) for rotating the torch 16 that is an end effector by using an endless belt 244.

Herein, the motor 24b for rotation is positioned so that an angle formed by the rotation axis of a rotating shaft 241b and the axis R is 90 degrees. Moreover, a drive pulley 242 is attached to the rotating shaft 241b of the motor 24b for rotation.

On the other hand, the leading-side housing part 21b places therein a hypoid gear 25b that swings the leading-edge arm 15b, a motor 26b for swing that drives the hypoid gear 25b, and the endless belt 244. Herein, the motor 26b for swing is positioned so that the rotation axis of a rotating shaft 261b becomes the extension direction (direction parallel to the axis R) of the leading-side housing part 21b.

The hypoid gear 25b includes a pinion gear 251b that is fitted into the rotating shaft 261b of the motor 26b for swing and a bevel gear 252b that is engaged with the pinion gear 251b. Herein, the bevel gear 252b of the hypoid gear 25b is positioned in a direction (direction identical with the axis B) in which an angle formed by its rotation axis and the rotation axis of the pinion gear 251b is 90 degrees.

In the hypoid gear 25b, the bevel gear 252b is rotated at a rotational speed slower than that of the pinion gear 251b. In other words, the hypoid gear 25b functions as a speed reduction mechanism that decelerates the output of the motor 26b for swing.

Moreover, the bevel gear 252b of the hypoid gear 25b has a cylindrical cavity whose shaft core is the axis B. A rotating shaft 245 that transmits the driving force of the motor 24b for rotation to the leading-edge arm 15b is rotatably inserted into the cavity.

A driven pulley 243 is attached to the portion of the rotating shaft 245 that is protruded into the leading-side housing part 21b. The endless belt 244 is wound around the driven pulley 243 and the drive pulley 242. The driving force of the motor 24b for rotation is transmitted by the endless belt 244 from the drive pulley 242 to the rotating shaft 245 via the driven pulley 243.

Moreover, the leading-edge arm 15b of the robot 1b is positioned at the position facing the lateral surface of the leading-side housing part 21b. The leading-edge arm 15b includes a tubular housing 31b that places therein the hypoid gear 30b. The circumferential surface of the tubular housing 31b is fixedly coupled to the leading edge of the rotating shaft of the bevel gear 252b of the hypoid gear 25b.

The hypoid gear 30b includes the pinion gear 246 into which the rotating shaft 245 rotationally driven by the motor 24b for rotation is fitted and the bevel gear 33b that is engaged with the pinion gear 246.

Herein, the pinion gear 246 and the bevel gear 33b are positioned so that an angle formed by each rotation axis is 90 degrees. More specifically, the rotation axis of the pinion gear 246 is identical with the axis B and the rotation axis of the bevel gear 33b is identical with the axis T. Moreover, the torch 16 is coupled to the leading end of the rotating shaft of the bevel gear 33b.

In the hypoid gear 30b, the bevel gear 33b is rotated at a rotational speed slower than that of the pinion gear 246. In other words, the hypoid gear 30b functions as a speed reduction mechanism that decelerates the output of the motor 24b for rotation.

By employing this configuration, the robot 1b sequentially transmits the driving force of the motor 24b for rotation to the rotating shaft 241b, the drive pulley 242, the endless belt 244, the driven pulley 243, the rotating shaft 245, the hypoid gear 30b, and the torch 16, in order of them. As a result, the robot 1b rotates the torch 16 by using the axis T as a rotation axis.

Moreover, the robot 1b sequentially transmits the driving force of the motor 26b for swing to the rotating shaft 261b, the hypoid gear 25b (the pinion gear 251b and the bevel gear 252b), and the leading-edge arm 15b, in order of them. As a result, the robot 1b swings the leading-edge arm 15b by using the axis B as a swing axis.

As described above, the robot 1b transmits the driving force of the motor 26b for swing to the leading-edge edge arm 15b through the hypoid gear 25b. In other words, the robot 1b does not require providing an endless belt that transmits the driving force of the motor 26b for swing to the leading-edge arm 15b. Therefore, according to the robot 1b, a production cost can be reduced because the number of parts required for swinging the leading-edge arm 15b is reduced.

The hypoid gear 30b of the leading-edge arm 15b functions as a speed reduction mechanism that reduces the rotational speed of the motor 24b for rotation. Moreover, the hypoid gear 25b of the robot arm 14b functions as a speed reduction mechanism that reduces the rotational speed of the motor 26b for swing.

As a result, because the robot 1b does not require a more expensive ready-made speed reducer than the hypoid gear 25b and the hypoid gear 30b to reduce the rotational speeds of the motor 24b for rotation and the motor 26b for swing, a production cost can be reduced.

Moreover, the hypoid gears 25b and 30b can comparatively easily change the layout of the speed reduction mechanism only by changing the size and combination of the pinion gears 251 and 246 and the bevel gears 252b and 33b.

In other words, the robot 1b has a higher degree of freedom with respect to the change of the internal layout of the robot arm 14b and the leading-edge arm 15b compared to when the ready-made speed reducer is provided. Therefore, the robot 1b can easily optimize the internal layout of the robot arm 14b by changing the size and configuration of the hypoid gears 25b and 30b.

As described above, the robot arm 14b includes the bottom-side housing part 20b that is provided on the bottom end of the robot arm 14b. Furthermore, the robot arm 14b includes the leading-side housing part 21b that has a narrower width than that of the bottom-side housing part 20b in the robot arm 14*b* and extends from the bottom-side housing part 20*b* toward the leading end of the robot arm 14*b*. The leading-edge arm 15*b* is positioned at the position facing the leading-side lateral surface of the leading-side housing part 21*b*.

As a result, in the robot 1*b*, because the leading part of the robot arm 14*b* is slimmer than its bottom part, the robot arm 14*b* can be prevented from interfering with other members when the robot arm 14*b* is actuated. Therefore, according to the robot 1*b*, it is possible to broaden the width of activities that are performed in the limited working space.

In the robot arm 14*b*, the motor 24*b* for rotation is placed in the bottom-side housing part 20*b*. As a result, because the weight of the leading part of the robot arm 14*b* is reduced, the easiness and accuracy of the rotation control performed by a robot controller on the robot arm 14*b* by using the axis R as a rotation axis can be still more improved.

As illustrated in FIG. 5A, the wire hose W that is the path of the welding wire and the shielding gas is guided to the leading-edge arm 15*b* by way of the space surrounded by the bottom-side housing part 20*b*, the leading-side housing part 21*b*, and the leading-edge arm 15*b*. Moreover, the wire hose W is supplied to the torch 16 by way of the inside of the leading-edge arm 15*b*.

More specifically, the wire hose W is guided to the leading-edge arm 15*b* along the lateral surface of the leading-side housing part 21*b* in the space sandwiched by the leading end of the robot arm 14*a* in the bottom-side housing part 20*b* and the bottom end of the leading-edge arm 15*b*. Moreover, the wire hose W is coupled to the torch 16 by way of the inside of the leading-edge arm 15*b*.

By employing this configuration, the wire hose W can be prevented from interfering with other members outside the robot arm 14*b* when the robot 1*b* is actuated. Therefore, according to the robot 1*b*, the breaking of welding wire and the leakage of shielding gas caused by the damage of the wire hose W can be prevented.

By employing this configuration, according to the robot 1*b*, because the wire hose W can be more shortened compared to the case where the wire hose W is coupled to the torch 16 by way of the insides of the bottom-side housing part 20*b* and the leading-side housing part 21*b*, a production cost can be reduced.

As described above, the robot 1*b* according to the third embodiment transmits the driving force of the motor 26*b* for swing provided inside the robot arm 14*b* to the torch 16 through the hypoid gear 25*b* to rotate the torch 16.

By employing this configuration, the robot 1*b* according to the third embodiment can swing the leading-edge arm 15*b* by using parts fewer than those of the robot that transmits the driving force of the motor 26*b* for swing to the leading-edge arm 15*b* through an endless belt. Therefore, according to the robot 1*b* according to the third embodiment, a production cost can be reduced.

Fourth Embodiment

Next, a robot 1*c* according to the fourth embodiment will be explained with reference to FIG. 6. In the robot 1*c* according to the fourth embodiment, the configuration of parts that are located at a more front side than the third arm 13 of the robot 1*b* illustrated in FIG. 4 is different from that of the robot 1*b* according to the third embodiment.

In other words, the configuration of the underlying part 10, the first arm 11, the second arm 12, and the third arm 13 of the robot 1*c* according to the fourth embodiment is the same as that of the robot 1*b* according to the third embodiment. For this reason, the configuration of parts that are located at a more front side than the third arm 13 of the robot 1*c* will be below explained.

Figure 6:
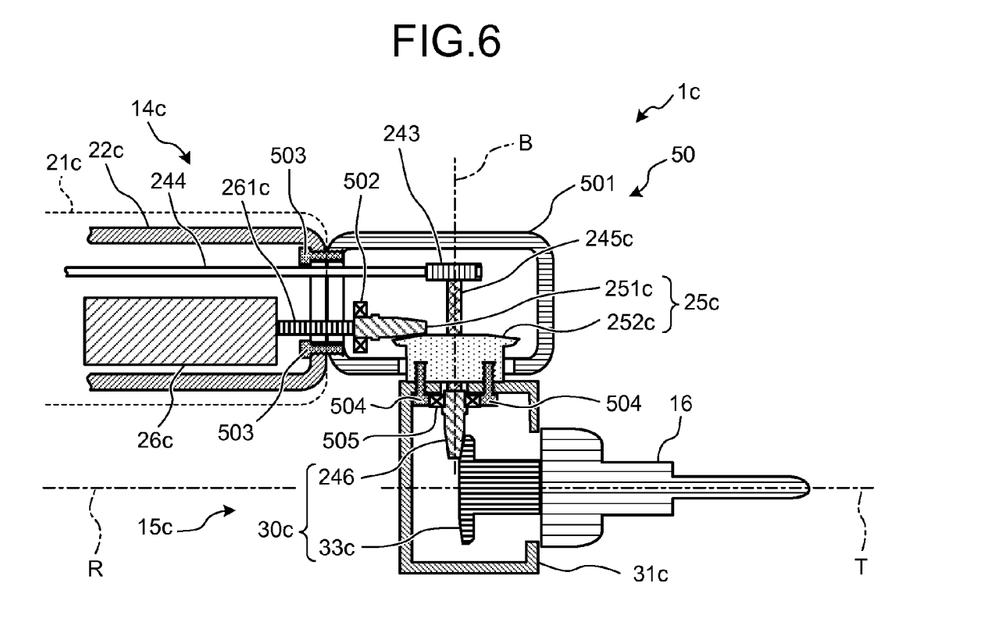
FIG. 6 is a sectional schematic diagram illustrating the configuration of parts that are located at a more front side than a third arm of a robot according to a fourth embodiment.

FIG. 6 is a sectional schematic diagram illustrating the configuration of parts that are located at a more front side than the third arm 13 of the robot 1*c* according to the fourth embodiment. Herein, a schematic cross section obtained by cutting the robot 1*c* with a plane that includes the axis R, the axis B, and the axis T after swinging a leading-edge arm 15*c* so that the axis R, the axis B, and the axis T are located on the same plane is illustrated in FIG. 6.

Although the wire hose W is not illustrated in FIG. 6 from the viewpoint of simplification of explanation, the wire hose W of the robot 1*c* is coupled to the torch 16 through the same route as that of the robot 1*b* according to the third embodiment.

As illustrated in FIG. 6, in the robot 1*c*, a hypoid gear 25*c* that rotates the torch 16 is constituted in an attachable/detachable gear unit 50 that couples a robot arm 14*c* to the leading-edge arm 15*c*.

More specifically, the robot arm 14*c* of the robot 1*c* includes a housing 22*c* that has a leading-side housing part 21*c* that extends from the bottom end toward the leading end of the robot arm 14*c*. Although the illustration is omitted herein, the robot arm 14*c* includes the bottom-side housing part 20*b* and the bottom-side housing part 20*b* places therein the motor 24*b* for rotation, similarly to the robot arm 14*b* illustrated in FIG. 5A.

The leading-side housing part 21*c* of the robot arm 14*c* places therein a motor 26*c* for swing that swings the leading-edge arm 15*c*. Herein, the motor 26*c* for swing is positioned so that the rotation axis of a rotating shaft 261*c* becomes the extension direction (direction parallel to the axis R) of the leading-side housing part 21*c*. The motor 26*c* for swing is placed in the leading-side housing part 21*c* in the state where the rotating shaft 261*c* is rotatably projected from the leading end of the leading-side housing part 21*c*.

The hypoid gear 25*c* that swings the leading-edge arm 15*c* is placed in a gear box 501 that is attachable to and detachable from the leading end of the leading-side housing part 21*c* of the robot arm 14*c*.

The hypoid gear 25*c* includes a pinion gear 251*c* that is supported by a bearing 502 and a bevel gear 252*c* that is engaged with the pinion gear 251*c*. The pinion gear 251*c* and the bevel gear 252*c* are positioned so that an angle formed by each rotation axis is 90 degrees.

The gear box 501 that places therein the hypoid gear 25*c* includes a hole into which the rotating shaft 261*c* of the motor 26*c* for swing and an endless belt are inserted and a hole through which the rotating shaft of the bevel gear 252*c* is projected to the outside.

In the hypoid gear 25*c*, the bevel gear 252*c* is rotated at a rotational speed slower than that of the pinion gear 251*c*. In other words, the hypoid gear 25*c* functions as a speed reduction mechanism that decelerates the output of the motor 26*c* for swing.

The bevel gear 252*c* of the hypoid gear 25*c* has a cylindrical cavity whose shaft core is the axis B. Moreover, a rotating shaft 245*c* that transmits the driving force of the motor 24*b* for rotation (see FIG. 5A) to the leading-edge arm 15*c* is rotatably inserted into the cavity. The driven pulley 243 is attached to the portion of the rotating shaft 245*c* that is protruded into the gear box 501.

The endless belt 244 is wound around the driven pulley 243 and the drive pulley 242 (see FIG. 5A). The driving force of the motor 24b for rotation is transmitted by the endless belt 244 from the drive pulley 242 to the rotating shaft 245c via the driven pulley 243.

On the other hand, the leading-edge arm 15c includes a tubular housing 31c that places therein a hypoid gear 30c for rotating the torch 16 by using the axis T as a rotation axis. The hypoid gear 30c includes the pinion gear 246 and a bevel gear 33c. The rotating shaft 245c that is rotated along with the driven pulley 243 of the gear box 501 is fitted into the pinion gear 246. The bevel gear 33c is engaged with the pinion gear 246.

The pinion gear 246 and the bevel gear 33c are positioned so that an angle formed by each rotation axis is 90 degrees. Moreover, the pinion gear 246 is supported by a bearing 505 and the torch 16 is coupled to the leading end of the rotating shaft of the bevel gear 33c.

When the gear unit 50 is attached to the robot 1c, the rotating shaft 261c of the motor 26c for swing is inserted into the predetermined hole of the gear box 501 and is fitted into the pinion gear 251c. Furthermore, the endless belt 244 is inserted into the predetermined hole of the gear box 501 and is wound around the driven pulley 243.

Then, the gear box 501 is fastened by a bolt 503 to the leading end of the leading-side housing part 21c to couple the gear unit 50 to the robot arm 14c.

Next, the rotating shaft 245c that passes through the bevel gear 252c of the hypoid gear 25c is fitted into the pinion gear 246 in the leading-edge arm 15c. After that, the bevel gear 252c of the hypoid gear 25c in the gear box 501 and the circumferential surface of the tubular housing 31c in the leading-edge arm 15c are fastened by bolts 504 to couple the gear unit 50 to the leading-edge arm 15c.

Because the gear unit 50 is attached to the robot 1c as described above, the driving force of the motor 26c for swing is transmitted to the leading-edge arm 15c via the gear unit 50 and thus the leading-edge arm 15c can be swung by using the axis B as a swing axis. Furthermore, the driving force of the motor for rotation is transmitted to the leading-edge arm 15c via the gear unit 50 and thus the torch 16 can be rotated by using the axis T as a rotation axis.

As described above, it has been explained that, in the robot 1c according to the fourth embodiment, the hypoid gear 25c that converts the driving force of the motor 26c for swing into the swing force of the leading-edge arm 15c is placed in the gear unit 50 that is attachable to and detachable from the robot 1c. Furthermore, it has been explained that the robot 1c has the configuration that the driving force of the motor for rotation is transmitted to the leading-edge arm 15c via the gear unit 50 that is attachable to and detachable from the robot 1c in order to rotate the torch 16.

As a result, because the robot arm 14c and the leading-edge arm 15c are coupled to each other in an interlocking manner only by installing the gear unit 50, the assembly operation of the robot 1c can be simplified. Therefore, the production cost of the robot 1c can be reduced by shortening the working time of a worker required for assembling one robot.

Figure 7:
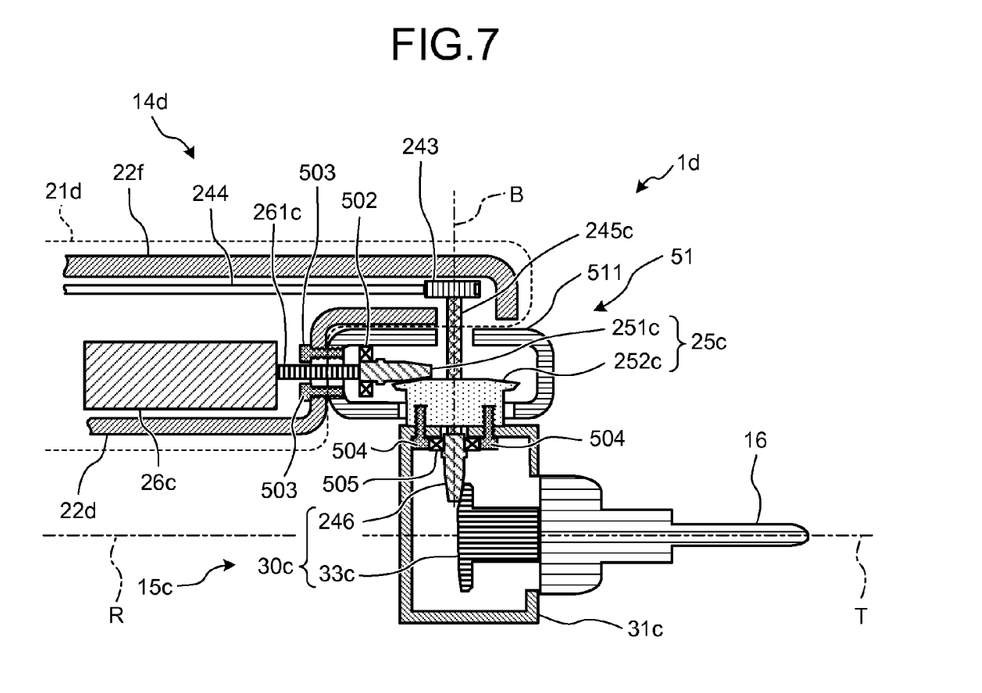
FIG. 7 is a diagram illustrating a robot according to an alternative example of the fourth embodiment.

Next, a robot 1d according to an alternative example of the fourth embodiment will be explained with reference to FIG. 7. FIG. 7 is a diagram illustrating the robot 1d according to the alternative example of the fourth embodiment. Herein, the cross section of components of the robot 1d corresponding to the components illustrated in FIG. 6 is schematically illustrated in FIG. 7. The same components of FIG. 7 as those of FIG. 6 have the same reference numbers.

As illustrated in FIG. 7, in the robot 1d according to the present alternative example, the configuration of a leading-side housing part 21d of a robot arm 14d and the configuration of a gear unit 51 that swings the leading-edge arm 15c by using the axis B as a swing axis are different from those of the robot 1c illustrated in FIG. 6. For this reason, the leading-side housing part 21d and the gear unit 51 will be below explained.

As illustrated in FIG. 7, the leading-side housing part 21d of the robot arm 14d of the robot 1d includes a housing 22d that places therein the motor 26c for swing that swings the leading-edge arm 15c by using the axis B as a swing axis and a cover body 22f that blocks up the opening portion of the housing 22d.

The gear unit 51 includes a gear box 511 that places therein the hypoid gear 25c for swinging the leading-edge arm 15c by using the axis B as a swing axis. The gear box 511 includes a hole into which the rotating shaft 261c of the motor 26c for swing is inserted and a hole through which the rotating shaft of the bevel gear 252c of the hypoid gear 25c is projected to the outside of the gear box 511.

Furthermore, the gear box 511 includes a hole, into which the rotating shaft 245c that is rotated along with the driven pulley 243 is inserted, at the position facing the hole through which the rotating shaft of the bevel gear 252c is projected to the outside of the gear box 511.

When the gear unit 51 is attached to the robot 1d, the rotating shaft 261c of the motor 26c for swing is inserted into the predetermined hole of the gear box 511 and is fitted into the pinion gear 251c.

After that, one end of the rotating shaft 245c is inserted into the predetermined hole of the gear box 511 to pass through the bevel gear 252c of the hypoid gear 25c, and the other end of the rotating shaft 245c is rotatably projected from the gear box 511. Next, the driven pulley 243 is attached to the other end of the rotating shaft 245c.

Then, the gear box 511 and the leading end of the leading-side housing part 21d are fastened by the bolt 503 to couple the gear unit 51 to the robot arm 14d. Herein, the driven pulley 243 is exposed outside the gear box 511.

Next, the endless belt 244 wound around the drive pulley 242 (see FIG. 5A) attached to the rotating shaft of the motor for rotation (see FIG. 5A) is wound around the driven pulley 243 that is exposed from the gear box 511. After that, the opening portion of the leading-side housing part 21d is blocked up by the cover body 22f.

Next, the rotating shaft 245c protruded from the gear box 511 is inserted into the predetermined hole of the leading-edge arm 15c and is fitted into the pinion gear 246 in the leading-edge arm 15c.

After that, the bevel gear 252c in the gear box 511 and the circumferential surface of the tubular housing 31c in the leading-edge arm 15c are fastened by the bolts 504 to couple the gear unit 51 to the leading-edge arm 15c.

Because the gear unit 51 is attached to the robot 1d as described above, the driving force of the motor 26c for swing is transmitted to the leading-edge arm 15c via the gear unit 51 and thus the leading-edge arm 15c can be swung by using the axis B as a swing axis. Furthermore, the driving force of the motor for rotation is transmitted to the leading-edge arm 15c via the gear unit 51 and thus the torch 16 can be rotated by using the axis T as a rotation axis.

As described above, it has been explained that, in the robot 1d according to the present alternative example, the hypoid gear 25c that converts the driving force of the motor 26c for swing into the swing force of the leading-edge arm 15c is placed in the gear unit 51 that is attachable to and detachable from the robot 1d. Furthermore, it has been explained that the robot 1d has the configuration that the driving force of the motor for rotation is transmitted to the leading-edge arm 15c via the gear unit 51 that is attachable to and detachable from the robot 1d in order to rotate the torch 16.

By employing the configuration, the assembly operation of the robot 1d can be simplified because the robot arm 14d and the leading-edge arm 15c are coupled to each other in an interlocking manner only by installing the gear unit 51. Therefore, the production cost of the robot 1d can be reduced by shortening the working time of a worker required for assembling one robot.

Moreover, the gear unit 51 illustrated in FIG. 7 can be used as the gear unit 41 for the robot 1a illustrated in FIG. 3 only by changing the threaded engagement position of the bolt 413 of the leading-edge arm 15a of the robot 1a illustrated in FIG. 3.

As a result, if the gear unit 51 according to the present alternative example is used, it is not necessary to individually prepare the gear unit 41 for the robot 1a and the gear unit 51 for the robot 1d when the robot 1a illustrated in FIG. 3 and the robot 1d illustrated in FIG. 7 are produced. Therefore, according to the gear unit 51 according to the present alternative example, a production cost can be reduced when the robot 1a and the robot 1d are produced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot comprising:
an end effector;
a leading-edge arm, the end effector being coupled to the leading-edge arm; and
a robot arm that is coupled to the leading-edge arm,
the robot arm comprising:
  first and second motors;
  a first hypoid gear that transmits a driving force of the first motor to the leading-edge arm coupled to the robot arm to rotate the end effector;
  a second hypoid gear that transmits a driving force of the second motor to the leading-edge arm coupled to the robot arm to swing the leading-edge arm; and
  first and second housing parts that extend from a bottom end toward a leading end of the robot arm, wherein
the leading-edge arm is positioned at the leading end of the robot arm between the first and second housing parts,
the robot arm includes a space formed from the bottom end to the leading end of the robot arm along a longitudinal direction thereof between the first and second housing parts,
the first housing part houses the first hypoid gear that rotates the end effector and the first motor that drives the first hypoid gear, and
the second housing part houses the second hypoid gear that swings the leading-edge arm and the second motor that drives the second hypoid gear.

2. The robot according to claim 1, wherein the first and second hypoid gears are placed in respective gear boxes that are attachable to and detachable from the robot arm.

3. The robot according to claim 1, wherein
the end effector is an arc welding torch, and
welding wire that acts as filler metal for arc welding is supplied to the torch by way of the space sandwiched by the first housing part and the second housing part and an inside of the leading-edge arm.

4. The robot according to claim 2, wherein
the end effector is an arc welding torch, and
welding wire that acts as filler metal for arc welding is supplied to the torch by way of the space sandwiched by the first housing part and the second housing part and an inside of the leading-edge arm.

5. A robot comprising:
an end effector;
a leading-edge arm, the end effector being coupled to the leading-edge arm; and
a robot arm that is coupled to the leading-edge arm,
the robot arm comprising:
  first and second motors;
  a first hypoid gear that transmits a driving force of the first motor to the leading-edge arm coupled to the robot arm to rotate the end effector;
  a second hypoid gear that transmits a driving force of the second motor to the leading-edge arm coupled to the robot arm to swing the leading-edge arm;
  a bottom-side housing part that is provided on a bottom end of the robot arm; and
  a leading-side housing part that has a narrower width than the of the bottom-side housing in the robot arm and that extends from the bottom-side housing part toward a leading end of the robot arm, wherein
the leading-edge arm is located at a position facing a lateral surface of the leading-side housing part,
the bottom-side housing part houses the first motor that drives the first hypoid gear, which rotates the end effector, by using an endless belt, and
the leading-side housing part houses the second hypoid gear that swings the leading-edge arm, the second motor that drives the second hypoid gear, and the endless belt.

6. The robot according to claim 5, wherein the second hypoid gear is placed in a gear box that is attachable to and detachable from the robot arm.

7. The robot according to claim 5, wherein
the end effector is an arc welding torch, and
welding wire that acts as filler metal for arc welding is supplied to the torch by way of a space, which is surrounded by the bottom-side housing part, the leading-side housing part, and the leading-edge arm, and an inside of the leading-edge arm.

8. The robot according to claim 6, wherein
the end effector is an arc welding torch, and
welding wire that acts as filler metal for arc welding is supplied to the torch by way of a space, which is surrounded by the bottom-side housing part, the leading-side housing part, and the leading-edge arm, and an inside of the leading-edge arm.

* * * * *